Nov. 11, 1952  R. A. NEAL  2,617,361
FUEL SYSTEM
Filed March 17, 1950
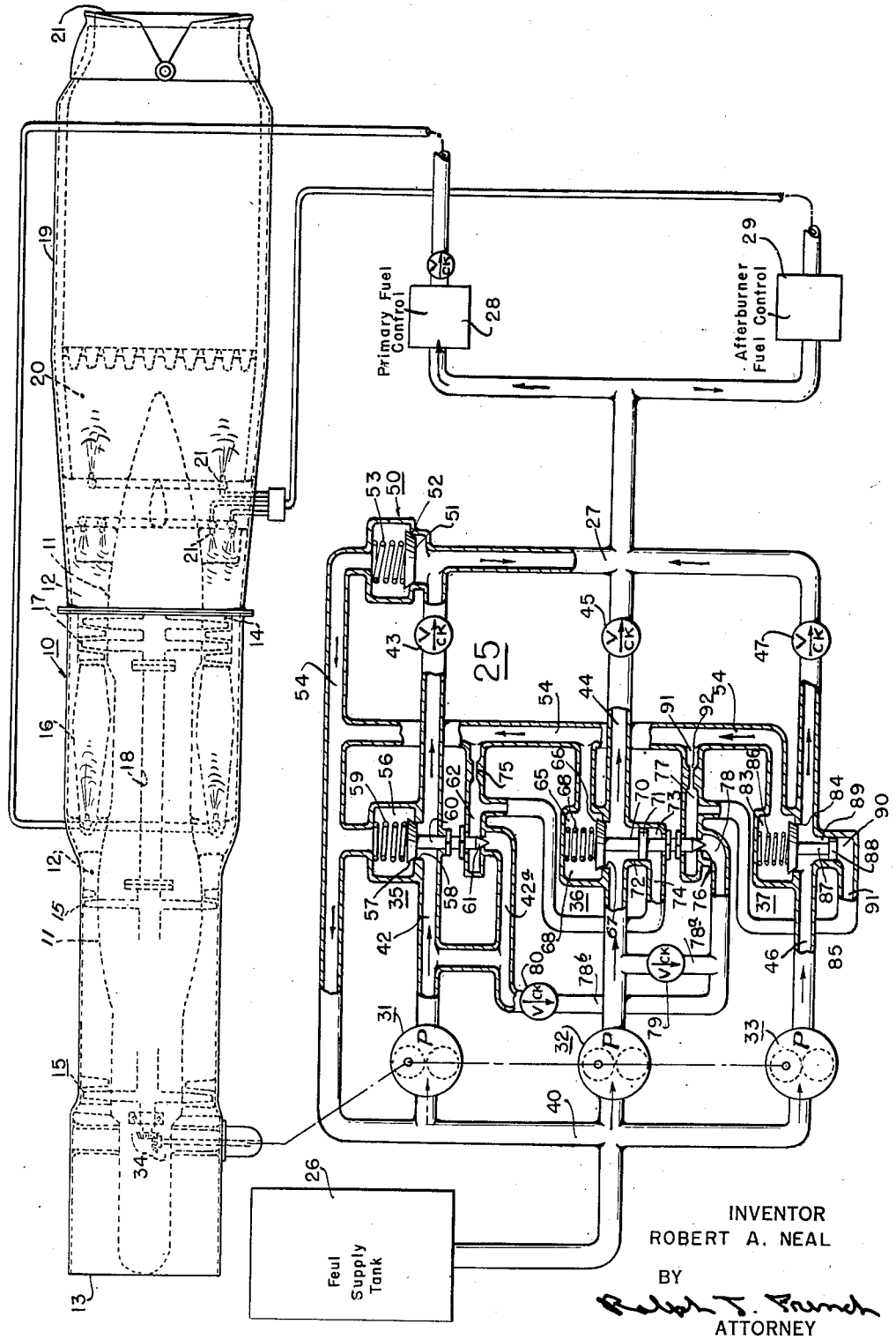
INVENTOR
ROBERT A. NEAL
BY
Robert J. French
ATTORNEY Patented Nov. 11, 1952

2,617,361

UNITED STATES PATENT OFFICE 2,617,361

FUEL SYSTEM

Robert A. Neal, Media, Pa., assignor to Westinghouse Electric Corporation, East Pittsburgh, Pa., a corporation of Pennsylvania Application March 17, 1950, Serial No. 150,200

3 Claims. (Cl. 103—11)

This invention relates to fluid fuel pressure apparatus, and more particularly apparatus for controlling operation of a plurality of fuel pumps.

With the advent of aircraft power plants of the type having an extensive range of thrust output, such as a ram jet or turbojet engine, it has become increasingly desirable to provide fuel control systems equipped with emergency or stand-by features rendering the plant safely operable even in the event of failure of certain auxiliary elements. This is especially true in the design of a fuel control system for a turbojet engine, the main fuel pump for which is customarily associated with an additional emergency pump to ensure against complete loss of the fuel supply in case of failure of a main pump. An engine having an afterburner requires relatively large fuel pump equipment. The addition to such a fuel system of an emergency pump may thus involve excessive increase in the weight of the equipment. It is an object of the present invention to provide a fuel pump system having an output variable over a wide range and employing a minimum number of pumps exhibiting the emergency features heretofore available only with a separate emergency pump apparatus.

Another object of the invention is the provision of fuel supply apparatus comprising a plurality of fuel pumps having a common drive, and a plurality of pressure responsive by-pass or relief valve devices operative selectively to cut one or more pumps into or out of effective operation in accordance with fuel demand.

A further object of the invention is the provision of pump control apparatus of the above character having means effecting compensation for failure of any pump by rendering the remaining pumps operative to take over the fuel pumping load.

These and other objects are effected by my invention as will be apparent from the following description and claims taken in connection with the accompanying drawings, forming a part of this application, in which the single figure is a diagrammatic elevational view of an aviation gas turbine power plant equipped with improved fuel pump and control apparatus constructed in accordance with the invention.

Referring to the drawing, the typical aviation gas turbine or turbojet engine therein disclosed comprises an outer substantially cylindrical casing structure 10, an interiorly disposed sectional core structure generally indicated at 11, forming an annular flow passage 12 extending from a frontal air inlet opening 13 to a rearwardly disposed turbine exhaust passage 14, and operating elements aligned therein and including an axial flow compressor 15, combustor apparatus 16, and a turbine 17 connected to the compressor by a common shaft 18. An afterburner section 19 is associated with the casing structure 10 providing a combustion chamber 20 in which fuel may be burned in the gases exhausted from the turbine 17. The afterburner section 19 terminates in a jet nozzle 21. The general principles of operation of such a power plant are well known, and may be briefly summarized as follows: air entering the inlet opening 13 is delivered under pressure from the compressor 15 to the combustion apparatus 16 for supporting combustion of fuel supplied thereto as hereinafter explained, and the heated motive gases thus provided are then expanded through the turbine 17 and are conducted to the afterburner section 19, from which the gases are discharged through the nozzle 21. Fuel may be supplied to the afterburner combustion chamber 20 when it is desired to augment the thrust produced by discharge of the motive gases to atmosphere by way of the nozzle 21.

According to the invention, fuel supply apparatus, indicated generally by the reference character 25, is provided for supplying fuel under pressure from a supply reservoir 26 to a fuel delivery pipe 27, from which fuel may be metered, by operation of a conventional primary control device 28, to the combustion apparatus 16. An afterburner fuel control device 29 is also provided for selective operation at desired intervals to meter fuel from the pipe 27 to the afterburner chamber 20, to establish greater thrust at the nozzle 21 than that incident to the supply of fuel to the combustion apparatus 16. It will be understood that the control devices 28 and 29 may be of any desired construction, operative to effect metering of fuel to the combustion apparatus at rates which are determined in accordance with the thrust called for in operation of the aircraft propelled by the turbojet. As hereinafter explained, the fuel supply apparatus 25 is adapted to render available an adequate supply of fuel under pressure to the delivery pipe 27 for distribution to the power plant by either or both of the fuel control devices 28 and 29, which when set for a low fuel flow will cause the back pressure of fuel in the delivery pipe 27 to rise accordingly, and when set for maximum fuel flow to the power plant will effect withdrawal of fuel at a lower pressure from the delivery pipe 27 at an appropriately rapid rate of flow. In other words, the fuel pressure in pipe 27 decreases incident to an increase in the rate of fuel flow through the control devices 28 and 29.

The fuel supply apparatus 25 comprises a plurality of fuel pumps 31, 32 and 33, preferably of the rotary positive displacement type, which are operatively connected through suitable gearing 34 to the rotor of the power plant, and an equal number of by-pass valve devices 35, 36 and 37, which are respectively associated with the pumps 31, 32 and 33 for selectively cutting each pump in or out of effective operational relation with respect to the fuel delivery system, as hereinafter explained. For the purpose of clearly disclosing the invention, the fuel supply apparatus is illustrated schematically in the drawing as comprising the various valve assemblies communicating through the medium of conduits or pipes, but it will be understood that if desired, this apparatus may readily be embodied in suitable casing structure, provided with passages rather than separate conduits.

The pumps 31, 32 and 33 are preferably similar in construction and capacity, and are arranged to draw fluid fuel from the supply reservoir 26 by way of a common inlet communication such as a pipe 40. The pump 31 is operative to discharge fuel under pressure by way of a pump discharge passage 42 and through a check valve 43 to the pipe 27 leading to the control devices 28 and 29. The pumps 32 and 33 are likewise disposed for discharging fuel under pressure to the pipe 27, the pump 32 being connected thereto through a discharge passage 44 containing a check valve 45, and the pump 33 communicating with pipe 27 through a discharge passage 46 containing a check valve 47. For emergency release of fuel under excessive pressure from the pipe 27, there is provided a relief valve device 50, which may comprise a valve element 51 subject to the fluid pressure in the pipe 27 and normally held on a seat 52 by a coil spring 53. The relief valve device 50 is operative only in the possible event of inadvertent increase in fuel pressure beyond a normal maximum, to control communication from the pipe 27 to a return passage or pipe 54 connected to the inlet communication 40 of the pumps 31, 32 and 33.

The by-pass valve device 35 comprises casing structure having a valve chamber 56 which communicates with the return passage 54 and contains a valve element 57 that is urged into engagement with a seat 58 by a calibrated coil spring 59 for controlling communication between pump discharge passage 42 and the valve chamber. The valve element has a stem 60 slidably mounted in a suitably sealed bore and terminating in a needle valve 61, which is operatively disposed in a valve chamber 62 for controlling communication thereto from a branch passage 42a of the passage 42.

The by-pass valve device 36 comprises casing structure having a valve chamber 65 communicating with the return passage 54 and containing a valve element 66 which is normally held on a seat 67 by a calibrated coil spring 68 in opposition to the pressure of fuel in the passage 44 acting on the pressure area of the valve element. The valve element 66 has a stem 70 carrying a piston 71 of smaller pressure area than that of the valve element, which piston is slidably disposed in a bore 72 between the passage 44 and a chamber 73 formed in the casing structure. The chamber 73 communicates through a passage 74 with the valve chamber 62 and thence through a restricted port 75 with the return passage 54.

A needle valve 76 is provided on the lower end of the stem 70 within a valve chamber 77 for controlling communication thereto from a passage 78, which communicates with the pump discharge passage 44 by way of a branch 78a, and with the pump discharge passage 42 through a branch 78b. A check valve 79 is provided for preventing backflow from passage 78 through the passage 78a to the passage 44. A similar check valve 80 is interposed in the passage 78b for preventing backflow therethrough to the passage 42.

The third by-pass valve device 37 comprises casing structure having a valve chamber 83 communicating with the return passage 54 and containing a valve element 84, which is engageable with a seat 85 and is subject to opposing pressures of fuel in the pump discharge passage 46 and of a calibrated coil spring 86. A stem 87 of the valve element 84 terminates in a piston 88 which is slidably interposed in a bore 89 between the passage 46 and a piston chamber 90 having communication through a passage 91 with the valve chamber 77 and thence by way of a restricted port 92 with the return passage 54.

The springs 59, 68 and 86 are calibrated to exert differing forces resisting opening of the respective by-pass valve elements 57, 66 and 84. Preferably, the spring 59 is stronger than spring 68, which in turn is stronger than spring 86, in order to effect operation of the by-pass valve devices to cut the associated pumps 31, 32 and 33 into operation in succession, for effecting gradually increased fuel flow corresponding to a decline in fuel pressure in the pipe 27, incident to an increase in fuel demand scheduled by the fuel control devices 28 and 29.

In describing a mode of operation of the foregoing equipment, it will be assumed that the fuel system is conditioned for operation with all passages and valve chambers charged with fuel, and that engine fuel requirements are initially less than the capacity of any of the continuously operating pumps 1, 2 or 3.

In operation, let it be assumed that the fuel control device 28 first meters fuel from the delivery pipe 27 to the usual nozzles of the combustion apparatus 16 at a minimum rate of flow, thereby establishing a relatively high back pressure of fuel in the delivery pipe 27. Upon sufficient build-up in this back pressure in delivery pipe 27 to a value sufficient to force the by-pass valve element 57 off its seat against the force of spring 59, fuel is by-passed through valve chamber 56 to the return passage 54. Until opening of the valve 57 of by-pass valve device 35, by-pass valve devices 36 and 37 remain inoperative due to the counterpressure of springs 68 and 86 and pressure of fuel on the upper sides of pistons 71 and 88, respectively. Upon upward movement of the valve element 57, however, unseating of the pilot needle valve 61 is effected, establishing in the chamber 73 and on piston 71 the output pressure of pump 31 to oppose the pressure of fuel in passage 44. The fuel pressure in passage 44 is thus rendered effective to shift upwardly the valve element 66 and needle valve 76, thereby effecting by-pass flow of fuel from discharge passage 44 to return passage 54. The increase in fuel pressure in chamber 90 incident to opening of the needle valve 76 is subsequently effective to permit unseating of the valve element 84 to establish the by-pass flow of fuel from pump 33 to the return pipe 54, thus completing the by-passing of all fuel not metered through the fuel control device 28 to the combustion apparatus 16 of the turbojet engine.

Meanwhile, with the second and third by-pass valve devices 32 and 33 open, the fuel pressure in pipe 42 communicating with the delivery pipe 27 may become reduced sufficiently to allow the strong spring 59 to urge the valve element 57 toward its seat 58. Upon a subsequent further increase in engine fuel demand, as determined by the fuel control devices 28 and 29, the withdrawal of more fuel and resultant reduction in fuel pressure in the delivery pipe 27 causes full reseating of the by-pass valve element 57. The needle valve 61 is seated at the same time, throttling flow of fuel under pressure from the pump discharge passage 42 to the piston chamber 73, thus reducing the fuel pressure opposing closure of by-pass valve element 66. As the fuel under pressure in the delivery pipe 27 is further withdrawn at a greater rate through one or both of the fuel control devices 28 and 29 for supply to the engine, the force of spring 68, although less than that of spring 59 acting on valve element 57, may finally be rendered effective, together with the now relatively low pressure of fuel on the piston 71 counterbalancing that on valve element 66, to move the latter to its seat 67. Fuel from pump 32 is thus added to the fuel from pump 31 for supply through the fuel control devices 28 and 29 to the power plant.

Under normal conditions, the output of pumps 31 and 32 will effectively supply all fuel required for moderate power output of both turbojet and afterburner portions of the power plant, assuming that fuel metering for maximum thrust is not called for by the fuel control devices. At such time, therefore, the third pump 33 will be idling or operating at low back pressure, due to continued by-pass flow of fuel from the pump outlet passage 46 past the by-pass valve element 84, which is maintained unseated, against the force of the relatively light spring 86, by the pressure of fuel flowing from the pump discharge passage 46 over the full area of the valve element. Although the needle valve 76 may be closed or nearly closed at this time, some fluid pressure may be retained in chamber 90 to act upwardly in the piston 88 to oppose fuel pressure in passage 46, due to communication by way of restriction 92 between passage 91 and the return passage 54 receiving the fuel flowing past the open by-pass valve element 84.

In the event that a maximum rate of fuel supply is demanded, in order to render available maximum thrust for executing an aircraft maneuver calling for unusual power, for example, further reduction in fuel pressure in the delivery pipe 27, incident to operation of the fuel control devices 28 and 29 to pass fuel to the engine at the increased rate, will permit the spring 86 to close the by-pass valve element 84, whereupon fuel delivered by pump 33 will flow past the check valve 47 to pipe 27 to augment that of the pumps 31 and 32.

In the event of failure of any of the pumps 31, 32 and 33, the other two pumps are always available with sufficient capacity to supply fuel at the rate required for operation of the power plant to effect high thrust output under ordinary circumstances, such as in executing a take-off operation of the aircraft. The control system constructed according to the invention thus exhibits desirable safety features without necessitating the provision of a separate emergency pump for the main engine control and the afterburner control, which would involve additional weight and cost. Thus, if pump 31 should fail, the by-pass valve device 35 would remain closed and pumps 32 and 33 would take over the full burden of supplying fuel according to the demand as determined by the fuel control devices 28 and 29. If pump 32 should fail, pumps 31 and 33 would be rendered cooperative to the same end. In the latter case, with pump 32 inoperative, if by-pass valve devices 36 and 37 are seated when supply of fuel is effected at a low rate, initial opening of the valve element 57 and needle valve 61 in response to build-up in fuel pressure in pipe 27 and in passage 42 would effect increase in fluid pressure in chamber 73 acting on piston 71, causing unseating of needle valve 76, in the absence of pressure in pump discharge passage 44. The consequent increase in fluid pressure acting upwardly on piston 88, will then facilitate initial unseating of the by-pass valve element 84. Thereafter, operation of the two pumps 31 and 33 would continue in the manner already described.

From the foregoing, it will be seen that by utilizing the by-pass valve apparatus embodying the invention described, three fuel pumps of moderate capacity are rendered cooperative to satisfy safety requirements otherwise necessitating the use of an additional large emergency pump. The valving arrangement also renders feasible idling operation, at a low pressure favoring long service life, of each fuel pump during a period of operation at a low fuel rate, while always remaining responsive to an increased demand for fuel to effect full delivery of fuel at the maximum output rates afforded by all of the pumps.

While I have shown the invention in but one form, it will be obvious to those skilled in the art that it is not so limited, but is susceptible of various changes and modifications without departing from the spirit thereof.

What I claim is:

1. In a fluid fuel system, a fuel supply, a plurality of fuel pumps connected to said supply, a fuel system delivery communication for receiving fuel under pressure individually discharged by said pumps, fuel control means operable for regulating flow of fuel under pressure from said delivery communication, a plurality of fuel pressure responsive relief valve devices interposed between the respective pumps and said delivery communication, biasing means tending to close each of said relief valve devices, fluid pressure means cooperative with said biasing means for rendering said relief valve devices selectively operative to effect by-passing of fuel discharged from each pump to the fuel supply, and fluid interlocked control means cooperative with said fluid pressure means for each of said relief valve devices for controlling successive operation thereof in accordance with variations in back pressure of fuel in said fuel system delivery communication established during regulation of said fuel control means.

2. In a fluid fuel system, a fuel supply, a plurality of fuel pumps connected to said supply, a fuel system delivery communication for receiving fuel under pressure individually discharged by said pumps, fuel control means operable for regulating flow of fuel under pressure through said delivery communication, a plurality of fuel pressure responsive relief valve devices associated with the respective pumps and selectively operative to effect by-passing of fuel discharged thereby to the fuel supply, a plurality of biasing means cooperative with the respective relief valve devices for normally urging said devices toward closed position preventing by-passing of fuel, a plurality of pilot valves operative by said relief valve devices, respectively, and fluid pressure operating means for each of said relief valve devices, each fluid pressure means being responsive to operation of the pilot valve of a separate one of said relief valve devices, said biasing means being individually responsive to different predetermined pump output pressures corresponding to fuel system pressure established in said fuel delivery communication due to regulation of said fuel control means, for effecting opening of said valve devices in succession in accordance with increase in such fuel system pressure corresponding to reduction in fuel demand.

3. A fluid fuel pressure system comprising a plurality of similar fuel pumps having a common drive connection, fuel control apparatus for regulating flow of fuel under pressure, said fuel control apparatus having a fuel inlet communicating with the fuel discharge outlet of each of said pumps, a fuel by-pass communication, a plurality of fuel pressure responsive relief valve devices respectively interposed between the discharge outlet of each of said pumps and said by-pass communication, and biasing means subjecting each of said relief valve devices to a different biasing force urging said device toward its by-pass closed position, one of said relief valve devices being subject to a greater biasing force and including a pilot valve for controlling communication from the corresponding pump discharge outlet to a control chamber, and another of said relief valve devices being subject to relatively less biasing force and having a piston element subject to pressure of fuel in said control chamber, said pilot valve being operative upon opening of said one relief valve device to establish communication from said corresponding pump outlet to said control chamber for effecting response of the said other relief valve device to operation of the first-named relief valve device.

ROBERT A. NEAL.

REFERENCES CITED

The following references are of record in the file of this patent:

UNITED STATES PATENTS

| Number | Name | Date |
|---|---|---|
| 2,411,312 | Yonkers | Nov. 19, 1946 |
| 2,440,371 | Holley, Jr. | Apr. 27, 1948 |

FOREIGN PATENTS

| Number | Country | Date |
|---|---|---|
| 576,509 | Great Britain | Apr. 8, 1946 |